United States Patent
Oshio

(10) Patent No.: US 6,201,205 B1
(45) Date of Patent: Mar. 13, 2001

(54) WIRE-CUT ELECTRIC DISCHARGE MACHINE

(75) Inventor: Yasuhiro Oshio, Aichi-ken (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/399,331

(22) Filed: Sep. 20, 1999

(30) Foreign Application Priority Data

Sep. 25, 1998 (JP) .................................................. 10-271418

(51) Int. Cl.⁷ .................................... B23H 1/00; B23H 7/10
(52) U.S. Cl. .................................................................. 219/69.12
(58) Field of Search ........................................... 219/69.12

(56) References Cited

U.S. PATENT DOCUMENTS 5,006,692 * 4/1991 Magara et al. ................... 219/69.12

FOREIGN PATENT DOCUMENTS

| 4-111718 | * | 4/1992 | (JP) | ................................... 219/69.12 |
| 5-277836 | | 10/1993 | (JP) . | |
| 1009684 | * | 4/1983 | (SU) | ................................... 219/69.12 |
| WO95/02482 | * | 1/1995 | (WO) | ................................ 219/69.12 |

* cited by examiner

Primary Examiner—Geoffrey S. Evans
(74) Attorney, Agent, or Firm—Oliff & Berridge, PLC

(57) ABSTRACT

A wire-cut discharge machine includes an extendable pipe which is provided in between a frame and a first wire guide to guide a wire electrode therein. To allow the first wire guide to move horizontally, a pair of spherical bearing mechanisms is provided; one is used for connecting a top end of a first pipe to a guide; and the other one is for connecting a bottom of a second pipe to the first wire guide. Therefore, due to the extendable pipe, broken wire electrodes can be connected automatically without fail and a workpiece can be electric discharge machined so that it can be tapered.

19 Claims, 8 Drawing Sheets

WIRE-CUT ELECTRIC DISCHARGE MACHINE

BACKGROUND OF THE INVENTION

1. Field of Invention

The invention relates to a wire-cut electric discharge machine, and in particular, to a wire-cut electric discharge machine capable of forming a workpiece with a taper including an extendable pipe which is provided between a frame and an upper wire guide to guide a wire electrode therein.

2. Description of Related Art

Conventionally, a wire-cut electric discharge machine is equipped with a wire electrode, a pair of an upper wire guide and a lower wire guide that supports the wire electrode across a workpiece, and a table moving mechanism that moves a table supporting a workpiece thereon in a horizontal direction at substantially a right angle relative to the length of the electrode. In electric discharge machining, the wire electrode is reeled out, guided near the surface of a workpiece by the upper and lower wire guides, and the table moving mechanism moves the table supporting the workpiece thereon in the horizontal direction. Arc electric discharging is repeatedly performed in between the wire electrode and the workpiece in insulated machining fluid, for example, resulting in electric discharge machining the workpiece.

Normally, the pair of wire guides is installed vertically, and the wire electrode guided by the wire guides, is also kept in tension vertically. When a workpiece is electrical discharge machined as above, a surface of the workpiece becomes vertical, however, when the pair of the wire guides is relatively moved in the horizontal direction, the wire electrode becomes slanted, and a processed surface of the workpiece can be electric discharge machined so that it can be tapered relative to a vertical direction.

The applicant of this application proposed a wire-cut electric discharge machine disclosed in Japanese Laid-Open Patent Publication No. 5-277836. In this wire-cut discharge machine, an automatic connection device that automatically connects a broken wire electrode is fixed to a frame at an upper part of the upper wire guide, and a vertically extendable pipe is provided in between the upper wire guide and the automatic connection device. Both ends of the pipe are respectively fixed to the automatic connection device and the upper wire guide. A wire electrode extending from the automatic connection device passes through the pipe and extends in the upper wire guide. The upper wire guide can be moved upward and downward by the wire guide lifting mechanism.

Since the wire-cut discharge machine provides the pipe, the machine gains a function of enabling the wire electrode to be guided to the upper wire guide on the occasion when a broken wire electrode is automatically connected. Therefore, the automatic connection device is mounted to the frame fixedly above the upper wire guide. Compared with the original conventional machine where the automatic connection device is raised and lowered along with the upper wire guide, a wire guide lifting mechanism is smaller, and deterioration of the automatic connection device due to stains of machining fluid can be prevented.

When workpieces are electrical discharge machined so that their processed surfaces can be tapered relative to the vertical direction, the wire electrode between the pair of wire guides needs to be inclined from the vertical direction. For this purpose, the upper wire guide needs to be moved horizontally because it is difficult to move the lower wire guide only in the horizontal direction.

In the wire-cut electric discharge machine described in Japanese Laid-Open Patent Publication No. 5-277836, however, both ends of pipe are fixedly linked to the automatic connection device and the upper wire guide respectively, and the upper wire guide is not allowed to move horizontally. Therefore, electrical discharge machining cannot be applied to workpieces, so that their processed surfaces become tapered inclined from the vertical direction.

To allow the upper wire guide to move horizontally, it is possible to omit the pipe in the machine. However, this is not desirable from a safety standpoint because the wire electrode therebetween is exposed to the outside, and the automatic connection device may not able to operate correctly because the wire electrode is not guided to the upper wire guide.

On the other hand, it is possible to make the automatic connection device rise and lower along with the upper wire guide by installing the automatic connection device to the upper wire guide. However, it becomes difficult to shrink the size of the wire guide lifting mechanism and prevent the automatic connection device from deteriorating due to stains of machining fluid.

SUMMARY OF THE INVENTION

A first object of the invention is to provide a wire-cut electric discharge machine that enables a surface of a workpiece to be tapered by introducing a hollow member to allow a wire electrode to be inserted in between a frame and a wire guide that is on an upper part thereof, and by connecting either end of the hollow member so that the pipe can oscillate. A second object of the invention is to provide a wire-cut electric discharge machine that is not subject to receiving an electrical shock by covering the hollow member in which the wire electrode is inserted with an insulated material.

To accomplish the first object, the invention provides a wire-cut electric discharge machine that includes a frame, a wire electrode to be supplied from the frame, and a first wire guide is disposed upstream of a workpiece. The first wire guide guides the wire electrode. A second wire guide is disposed downstream of the workpiece opposite to the first wire guide. The second wire guide guides the wire electrode. A first moving device moves the workpiece relative to said first and second wire guides. A second moving device moves the first wire guide in a direction that is substantially perpendicular to the lengthwise of the wire electrode. A hollow member is mounted between the frame and the first wire guide. The hollow member enables the wire electrode to pass through therein. The hollow member is able to extend and contract in a lengthwise direction of the hollow member. A connecting mechanism connects one end of the hollow member to the frame, and connects another end of the hollow member to the wire guide. The connecting mechanism includes of a first connecting member and a second connecting member. The first connecting member is attached to the frame. The first connecting member enables one end of the hollow member to oscillate. The second connecting member is attached to the first wire guide. The second connecting member enables another end of the hollow member to oscillate.

In the case where electrical discharge machining is performed with the first and second wire guides set on an identical axis relative to the length of the wire electrode, a workpiece is machined so that a processed surface becomes parallel to a vertical direction. On the other hand, where electrical discharge machining is performed after the second moving device moves the first wire guide to set the first and second wire guides in different positions relative to the length of the wire electrode, a workpiece is machined so that a processed surface becomes tapered toward a direction to which the first wire guide moves.

Namely, since the wire-cut electric discharge machine of this invention has been equipped with the second drive device and the connecting mechanism, it can move the first wire guide in a direction at right angles substantially to the length of the wire electrode, wherein both ends of the hollow member are kept connected to the frame and the first wire guide respectively. Hereby, the wire electrode guided by the first and second wire guides is kept inclined relative to a direction to which the first wire guide moves, and it is possible to carry out electrical discharge machining so that a surface of a workpiece to be processed can be tapered with an inclination relative to a direction to which the first wire guide moves. The wire electrode has high safety since it is covered with a hollow member in order not to be exposed. In the case where the automatic connection device is attached to the frame, the wire electrode can be guided to the first wire guide, thus leading the automatic connection device to surely connect broken wire electrode automatically. Compared with the original conventional machine that moves the automatic connection device and its associated elements along with the first wire guide, the automatic connection device is securely fixed to the frame, and placed far from the electric discharge member of the invention, which can prevent deterioration due to stains of the machining fluid on the automatic connection device.

In a preferred aspect of the invention, the third moving device that can move the first wire guide in substantially a lengthwise direction of the wire electrode, is further provided.

When the third moving device is activated, the hollow member stretches and shrinks, and the first wire guide moves in a lengthwise direction of the wire electrode. Therefore, the position of the first wire guide can be easily adjusted to a size of a workpiece along the lengthwise direction of the wire electrode, which prevents the machining precision from being reduced.

In another preferred aspect of the invention, the wire-cut electric discharge machine includes a hollow member that has a plurality of pipes that interfit each other slidably.

When the first wire guide, which is across the second wire guide, is moved in a direction at substantially right angles relative to the length of the wire electrode, or in a nearly lengthwise direction of the wire electrode, the hollow member can surely stretch and shrink.

In a further preferred aspect of the invention, the wire-cut electric discharge machine has a tubular insulated cover so as to cover the hollow member in addition. Although there is a danger in the wire electrode since high voltages are applied to the wire electrode while discharge machining, the insulated cover can prevent a worker from directly touching the hollow member where the wire electrode is inserted, as much as possible, which will contribute to high safety.

In another preferred aspect of the invention, the connecting mechanism is a spherical bearing mechanism that includes a spherical shank secured to the hollow member and a bearing surface that supports the spherical shank rotatably.

Since the wire guide drive device allows the first wire guide to move, the hollow member can be surely connected at one end to the guide part in the frame, and at the other end to the first wire guide.

In a further preferred aspect of the invention, the spherical shank includes a wire guide part thereon that guides the wire electrode into the hollow member.

Therefore, the wire electrode can be surely guided inside the hollow member via the wire guide part formed on the spherical shank.

In another preferred aspect of the invention, the wire-cut electric discharge machine provides the wire guide part near the center of which the spherical shank rotates.

Therefore, in the case that the hollow oscillates to rotate the spherical shank, the wire guide part is always near the center of which the spherical shank rotates regardless of the face when the spherical shank rotates, and can thus surely guide the wire electrode inside the hollow member.

To accomplish the second object, the invention provides a wire-cut electric discharge machine that includes a frame, and a wire electrode to be supplied from the frame, and a first wire guide to be positioned upstream of a workpiece. The first wire guide leads the wire electrode. A second wire guide is positioned downstream of the workpiece opposite to the first wire guide. The second wire guide leads the wire electrode. A first drive device moves the workpiece relative to the first and second wire guides. A hollow member is mounted between the frame and the first wire guide. The hollow member enables the wire electrode to pass through therein. The hollow member is able to extend and contract in a lengthwise direction of the hollow member. At least a part of the surface on the hollow member is covered with an insulated material.

Although there is a danger in the wire electrode since high voltages are applied to the wire electrode while discharge machining, a part of the surface on the hollow member at least is covered with insulated material, which can prevent a worker from receiving an electrical shock by directly touching the hollow member into which the wire electrode is inserted, as much as possible, which will contribute to high safety.

In a further preferred aspect of the invention, the hollow member includes a metallic pipe, and a tubular cover that covers the hollow member. The tubular cover is made from an insulated material. Therefore, it has certainly excellent strength and insulation property by virtue of cover material.

BRIEF DESCRIPTION OF THE DRAWINGS

The invention will be described in greater detail with reference to preferred embodiments thereof and the accompanying drawings wherein.

DESCRIPTION OF THE PREFERRED EMBODIMENTS

One preferred embodiment of the invention will be described in detail with reference to the accompanying drawings.

This is an example of the invention being applied to a wire-cut electric discharge machine that processes a workpiece electronically through arc discharge occurring between a wire electrode and the workpiece.

Figure 1:
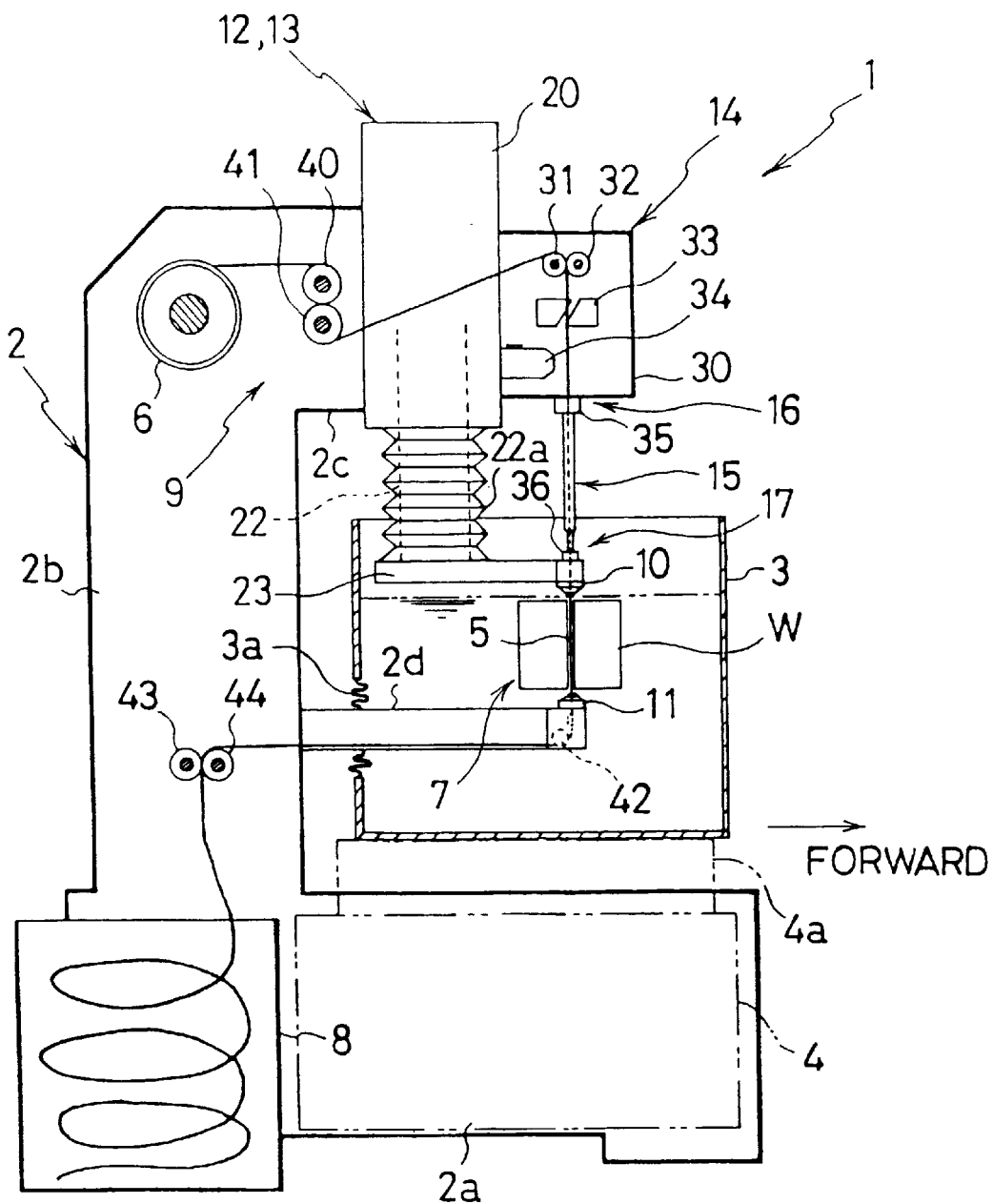
FIG. 1 is a schematic side view of an electric discharge machine according to the first embodiment of the invention.

As shown in FIG. 1, a wire-cut electric discharge machine 1 includes a frame 2, a work tank 3, which can fix a workpiece in an insulated machining fluid therein, a work tank horizontal movement mechanism 4 that moves the work tank 3 via a table 4a in the horizontal direction, a wire electrode 5, a wire supply reel 6 that winds the wire electrode 5, an electric discharge member 7 inside the work tank 3, causing a workpiece to be processed by discharge machining, a wire storage container 8 in which the wire electrode 5 is withdrawn, and a wire feeding mechanism 9 which transports the wire electrode 5 from the wire supply reel 6 through the electric discharge member 7 to the wire storage container 8.

Furthermore, in the wire-cut electric discharge machine 1, a first wire guide 10 and a second wire guide 11 that support the wire electrode 5 are provided to hold a workpiece W. The first wire guide 10 is moved horizontally relative to the second wire guide 11 by the first wire guide moving mechanism 12, and vertically by the second wire guide moving mechanism 13. An automatic connection device 14 is provided to automatically connect the wire electrode 5 if it is broken. The wire electrode 5 is passed through a pipe 15, which is extendable and placed in between the automatic connection device 14 and the first wire guide 10. To allow the first wire guide moving mechanism 12 to move the first wire guide 10 horizontally, a top end of the pipe 15 is connected to the automatic connection device 14, and the bottom end is connected to the first wire guide 10, respectively via first and second spherical bearing mechanisms 16 and 17 (served as connecting mechanism), which operate in a pair, as well as the first wire guide moving mechanism 12 which allows the first wire guide 10 to move horizontally.

The frame 2 includes a bed 2a, a vertical column 2b standing at the rear of the bed 2a, and an upper arm 2c, which slightly extends forward from upper part of the vertical column 2b, a fixed guide 20 for the first and second wire guide moving mechanisms 12 and 13 that are fixed to the front end of the upper arm 2c, and a casing 30 for the automatic connection device 14 fixed to the front end of the fixed guide 20. The wire storage container 8 is placed at the rear of the bed 2a so that it can be taken out, and the wire supply reel 6 is installed at the top end of the vertical column 2b, and rotates there according to the machine operation.

The work tank 3 is provided between the bed 2a of the frame 2 and the fixed guide 20 and the casing 30. A lower horizontal frame 2d, which extends forward from the vertical column 2b, is inserted into the work tank 3 from an opening at the rear. The second wire guide 11 is attached to the front top end of the lower horizontal frame 2d. To prevent the machining fluid from leaking from between the opening of the work tank 3 and the lower horizontal frame 2d, for example, a bellows transformable member 3a is linked to between them so as to allow the relative movement in horizontal direction.

The work tank horizontal movement mechanism 4 has an X-axis driving motor (not shown) which moves the work tank 3 to left and right (in the X direction), and a Y-axis driving motor (not shown) which moves work tank 3 back and forth (in the Y direction). The X-and Y-axis driving motors can move the work tank 3 independently back and forth and left and right via the table 4a. The work tank 3 can move a workpeice W and the first and second wire guides 10 and 11 (and the wire electrode 5) relatively in the horizontal direction.

The first wire guide moving mechanism 12 has the fixed guide 20, the X- and Y-axis driving motors (not shown) installed therein, a movable slider 22 installed in an accordion cover 22a that extends downward from the fixed guide 20, and a horizontal arm 23 that is secured to the bottom of the movable slider 22 and extends forward. The first wire guide 10 is attached to the front end of the bottom of horizontal arm 23, facing the second wire guide 11. When the X- and Y-axis driving motors run, the first wire guide 10 is horizontally moved toward the second wire guide 11 via the movable slider 22 and the horizontal arm 23.

The second wire guide mechanism 13 includes the fixed guide 20, the movable slider 22, the horizontal arm 23, which are used common to the first wire guide moving mechanism 12, and a vertical driving motor (not shown) inside the fixed guide 20. When the vertical driving motor runs, the first wire guide 10 is moved vertically via the movable slider 22 and the horizontal arm 23.

The automatic connection device 14 has feed rollers 31 and 32 inside the casing 30, a wire cutter 33, a wire detecting sensor 34, and a jet water guide device (not shown). The bottom of the casing 30 is fixed to a synthetic resin guide 35, which is linked to the top of the pipe 15 via the first spherical bearing mechanism 16. The front top of the horizontal arm 23 is fixed to a synthetic resin guide 36, which is linked to the bottom of the pipe 15 via the second spherical bearing mechanism 17.

The wire feeding mechanism 9 has feed rollers 40 and 41 provided in front of the wire supply reel 6, feed rollers 31 and 32 in the automatic connection device 14, a feed roller 42 inside the lower horizontal frame 2DS1, and feed rollers 43 and 44 immediately above the wire storage container 8.

The wire electrode 5 extends downward from the wire supply reel 6 via feed rollers 40, 41, 31, and 32, extends across the wire cutter 33 and the wire detecting sensor 34, passes through the pipe 15, and then reaches the first wire guide 10. The wire electrode 5 is guided by the first wire guide 10, extending downward via the electric discharge member 7 and the second wire guide 11, and finally winding at the wire storage container 8 through the feed rollers 42, 43, and 44. The feed rollers 31 or 32, and 43 or 44 are at least incorporated into a driving roller.

Next, operation of the automatic connection device 14 will be described. When the wire electrode 5 is broken between the first and second wired guides 10 and 11, feed rollers 31 and 32 are rotated backward, causing the upper broken wire electrode 5 to pull up, the wire detecting sensor 34 detects an end of the broken wire electrode 5, and then feed rollers 31 and 32 stop with the wire electrode 5 held in between.

After that, the wire cutter 33 operates to eliminate the wire electrode 5 damaged by electric discharge machining. On the other hand, the lower broken wire electrode 5 is fed via feed rollers 43 and 44 to the wire storage container 8, feed rollers 31 and 32 rotate in normal direction, and then the wire electrode 5 is fed downward. The wire electrode 5, which is guided by the pipe 15, reaches the first wire guide 10. As the wire electrode 5 is continuously fed downward, it passes through the workpiece W and is introduced into the second wire guide 12, while it is guided by the jet water from the jet water guide device.

The jet water guide device is configured so that, for example, a precise directional nozzle provided in the first wire guide 10 can jet a high pressurized water to the second wire guide 11, and the wire electrode 5 can be guided by the second wire guide 11 through the use of fine water streams formed at this time. When an end of the wire electrode 5 reaches the feed roller 42 and is continuously fed, another jet water guide device may be used so that the wire electrode 5 can be guided to a guide.

The pipe 15 and the first and second spherical bearing mechanisms 16 and 17 will be described with reference to FIGS. 2–5 in detail.

The pipe 15 includes of a first pipe 50 and a second pipe 51 with a greater diameter, which interfit each other and can slide freely. The second pipe 51 moves over the first pipe 50 while stretching and shrinking. A spherical shank 60 of the first spherical bearing mechanism 16 is fixed to an upper end of the first pipe 50, and a spherical shank 65 of the second spherical bearing mechanism 17 is fixed to a bottom end of the second pipe 51.

The surface of the pipe 15 is covered with a tubular insulated tubular cover 52 made of synthetic resin. An inner diameter of the tubular cover 52 is slightly greater than an outer diameter of the second pipe 51. An O-ring 53 which is fitted into the top of the tubular cover 52 presses into contact with the outer surface of a shank 60b which is a part of the spherical shank 60. An O-ring 54 which is fitted into the bottom of the tubular cover 52 presses into contact with the outer surface of the second pipe 51.

A force applied by the O-ring 53 to press into contact is considerably greater than that applied by the lower O-ring 54. When the second pipe 51 stretches and shrinks on the first pipe 50, the upper end of the tubular cover 52 is maintained to the spherical shank 60 by the force of the O-ring 53, the pipe 51 slides on the O-ring 54, therefore almost all the first pipe 51, at least, of the pipe 15 is always covered with the tubular cover 52. The upper end of the tubular cover 52 can be fixed to the spherical shank 60. In this case, the O-ring 53 can be omitted.

The first spherical bearing mechanism 16 has the spherical shank 60 secured to the upper end of the first pipe 50, and the bearing surface 61 where the spherical shank 60, formed at the lower part of the guide 35, rotates freely. In the upper end of the guide 35, a guide part 35a in the shape of a reverse cone is formed, whose bottom is connected to the spherical shank 60. In the upper end of the spherical shank 60, a wire guide part 60a in the shape of a reverse cone is formed, whose bottom is connected to the inside of the first pipe 50.

The bottom of the wire guide part 60a is provided at the center of which the spherical shank 60 rotates no matter where it faces. The wire electrode 5 is guided through the first pipe 50 via the guide part 35a and the wire guide part 60a from the casing 30.

The second spherical bearing mechanism 17 has a spherical shank 65 secured to the bottom of the second pipe 51, and the bearing surface 66 where the spherical shank 65, formed at the lower part of a guide 36, rotates freely. A shank 65b where the bottom of the second pipe is combined with the spherical shank 65 is inserted into a recess 36a, which is formed at the top of the guide 36, with slight play.

In the upper end of the spherical shank 65, a wire guide part 65a in the shape of a reverse cone is formed, whose bottom is connected to the inside of the first wire guide 10. The bottom of the wire guide part 65a is provided at center where the spherical shank 65 rotates no matter where it faces. The wire electrode 5 is guided through the first wire guide 10 via the wire guide part 65a from the second pipe 51.

The first wire guide 10 includes a power supply area 10a to apply high voltage to the wire electrode 5 by means of an arc discharge circuit (not shown), and a guide 10b situated therebelow to lead the wire electrode 5 to the second wire guide 11. The second wire guide 11 also includes a power supply area 11a to apply high voltage to the wire electrode 5.

Operation and advantages of the wire-cut electric discharge machine will be described.

The first and second spherical bearing mechanisms 16 and 17 link the pipe 15 to the guide 35 (guide part 35a) in the frame 2 and the first wire guide 10. As the first wire guide moving mechanism 12 moves the first wire guide 10 in the horizontal direction, accordingly the pipe 15 oscillates, and stretches and shrinks, the first wire guide 10 is permitted to move in the horizontal direction.

The wire electrode 5 is guided from the frame 2 via the guide part 35a of the guide 35 to the wire guide part 60a of the spherical shank 60, inserted into the pipe 15, passing through the wire guide part 65a of the spherical shank 65, and the wire guide 10, and finally reaches the second wire guide 11. The wire electrode 5 is supported by the first and second wire guides 10 and 11 to hold the workpiece W.

During electric discharge machining, as the workpiece W along with the work tank 3 is transferred by the work tank horizontal movement mechanism 4 in the horizontal direction to submerge the workpiece W in the machining fluid stored in the work tank 3, arc discharge machining is repeatedly carried out between the wire electrode 5 supported by the first and second wire guides 10 and 11, and the workpiece W submerged in the machining fluid stored in the work tank 3, such that the workpiece is electronically machined.

Figure 2:
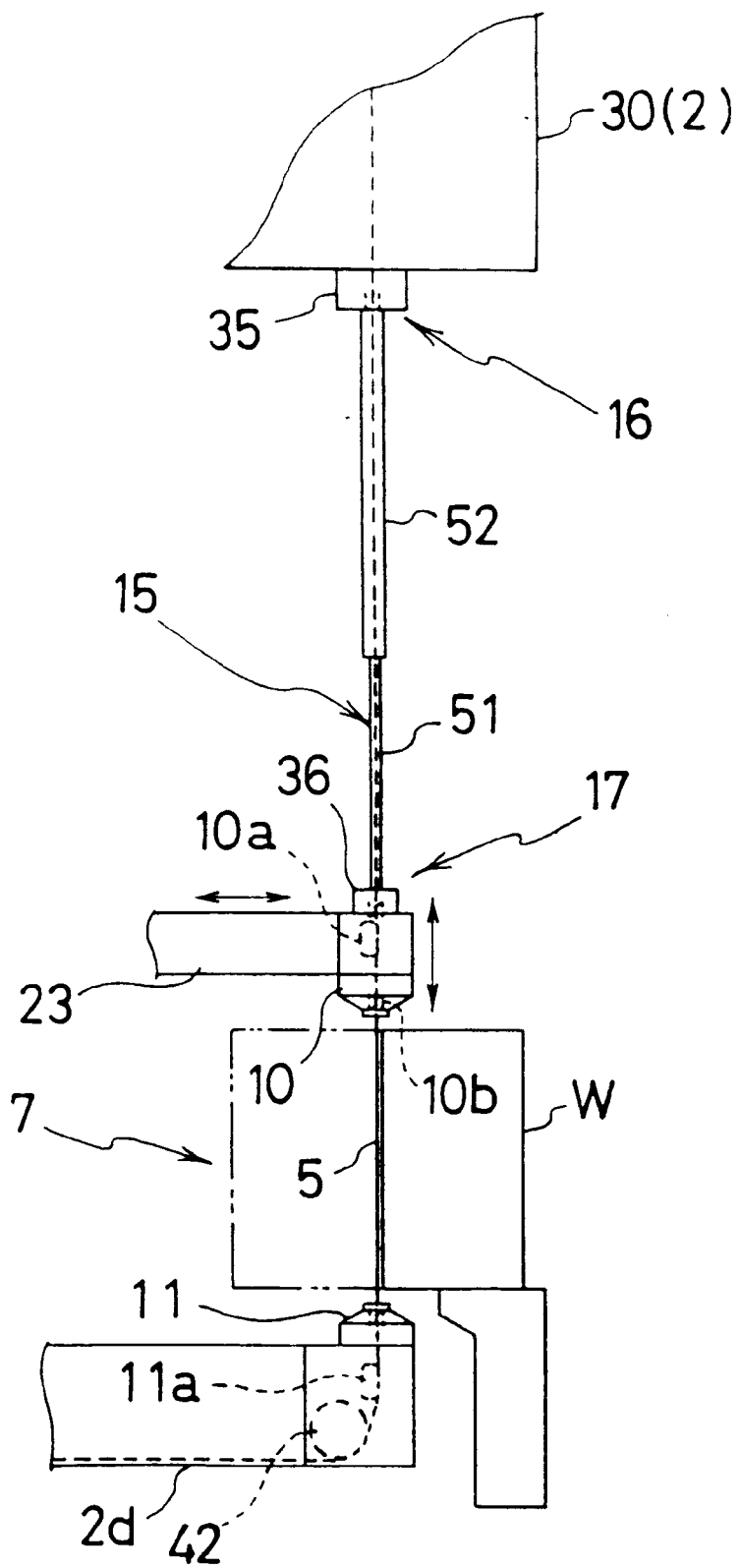
FIG. 2 shows an enlarged side view including pipes (in vertical position) and wire guides.
Figure 3:
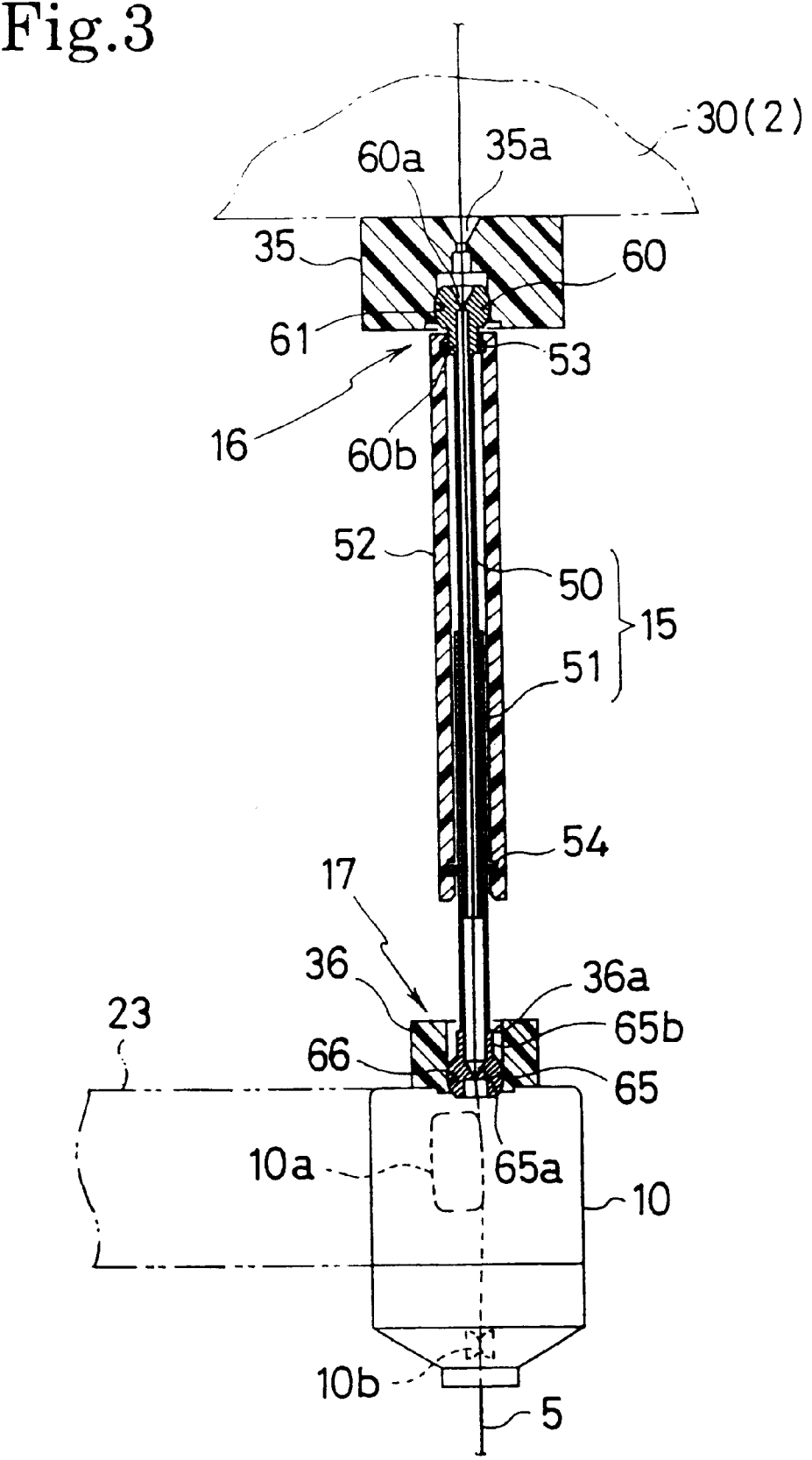
FIG. 3 is an enlarged cross-sectional view including spherical bearing mechanisms indicated in FIG. 2.
Figure 4:
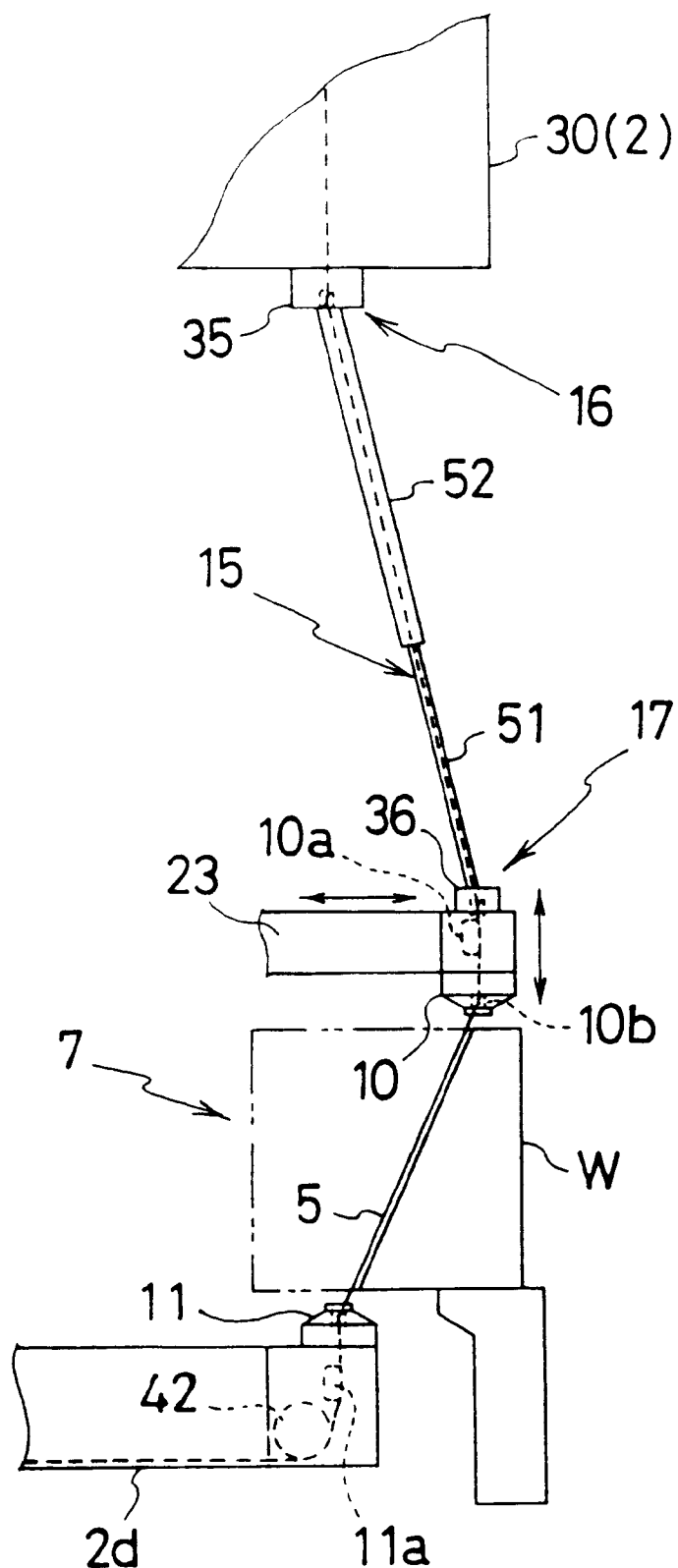
FIG. 4 is an enlarged side view of pipes (in oscillating position) and wire guides.
Figure 5:
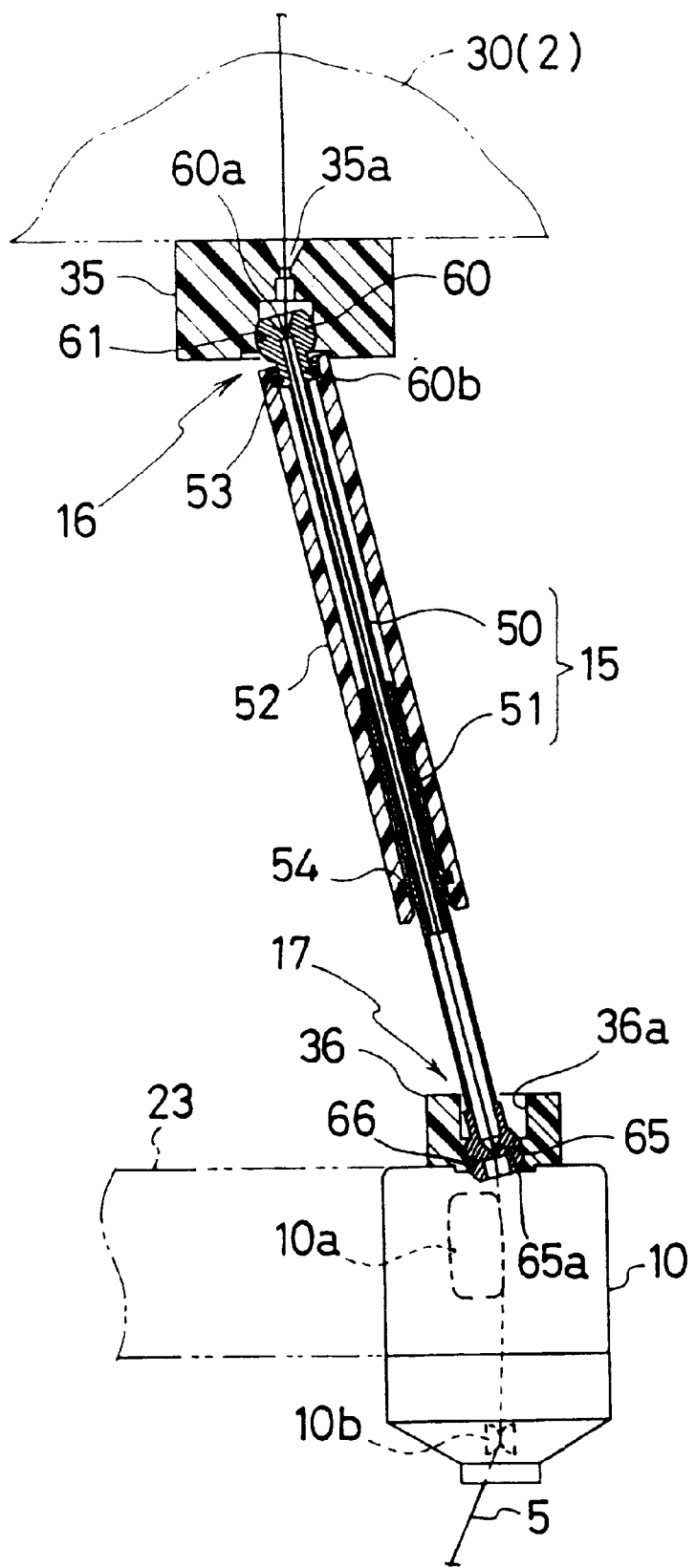
FIG. 5 is an enlarged cross-sectional view of spherical bearing mechanisms indicated in FIG. 4.

As the first wire guide moving mechanism 12 transfers the first wire guide 10 horizontally, as shown in FIGS. 2 and 3, the first and second wire guides 10 and 11 are positioned on an identical vertical axis for electric-discharge machining, the wire electrode 5 is also kept vertical. Therefore, a side of the workpiece W is processed. As electric-discharge machining is performed with the first and second wire guide 10 and 11 in different positions relative to the vertical axis, as shown in FIGS. 4 and 5, the wire electrode 5 is kept inclined. Therefore, the workpiece W is machined so as to be tapered.

According to the wire-cut electric discharge machine 1, since the first wire guide moving mechanism 12, the pipe 15, a pair of the first and second spherical bearing mechanisms 16 and 17 are provided, both ends of the pipe 15 remain linked respectively to the guide part 35a in the frame 2 and the first wire guide 10, and the first wire guide 10 can be moved horizontally while the second wire guide 11 is fixed. This makes the wire electrode 5 supported by the first and second wire guide 10 and 11 keep inclined, allowing electric-discharge machining of a surface to processed of the workpiece W with an inclination.

As a result, the automatic connection device 14 is securely fixed to the frame 2, and placed far from the electric discharge member 7, which can prevent deterioration due to stains of the machining fluid on the automatic connection device 14. Furthermore, the wire electrode 5 is desirable in terms of safety because it is inserted into the pipe 15, and it can be surely guided to the first wire guide 10, to be sure that the automatic connection device 14 functions.

The second wire guide moving mechanism 13 includes the first wire guide 10, which can move up and down through the stretching and shrinking of the pipe 15. Therefore, it is easy to adjust a height of the first wire guide 10 to a size of the workpiece W. This advantage will prevent a reduction of machining precision.

The pipe 15 includes a pair of the first and second pipes 50 and 51 that are fitted to each other so as to slide freely. When the first wire guide 10 is moved horizontally or up and down, the pipe 15 surely stretches and shrinks.

Although there is a danger in the wire electrode since high voltages are applied to the wire electrode while discharge machining, the pipe 15 in which the wire electrode 5 is inserted is covered with the insulated tubular cover 52, which can prevent a worker from directly touching the pipe 15, as much as possible, which will contribute to high safety.

The spherical shank 60, which is secured to the pipe 15 in the first spherical bearing mechanism 16, has the wire guide part 60*a*. Due to the wire guide part 60*a*, the wire electrode 5 can be surely inserted into the pipe 15. The spherical shank 65, which is secured to the pipe 15 in the second spherical bearing mechanism 17, has the wire guide part 65*a*. Because of the wire guide part 65*a*, the wire electrode 5 can be surely inserted into the first wire guide 10.

The bottom of the wire guide part 60*a* (65*a*) is provided at the center of which the spherical shank 60 (65) rotates. Even when the spherical shank 60 (65) rotates according to oscillation of the pipe 15, the bottom of the wire guide part 60*a* (65*a*) is always positioned at the center of which the spherical shank 60 (65) rotates, no matter where it faces. Therefore, the wire guide part 60*a* (65*a*) can surely guide the wire electrode 5 to the inside of the pipe 15 (the first wire guide 15).

Next, other embodiments of a modified aspect of the invention will be described in detail. The same elements as the above-mentioned embodiment are, however, given the same reference characters and duplicative explanations are omitted.

Figure 6:
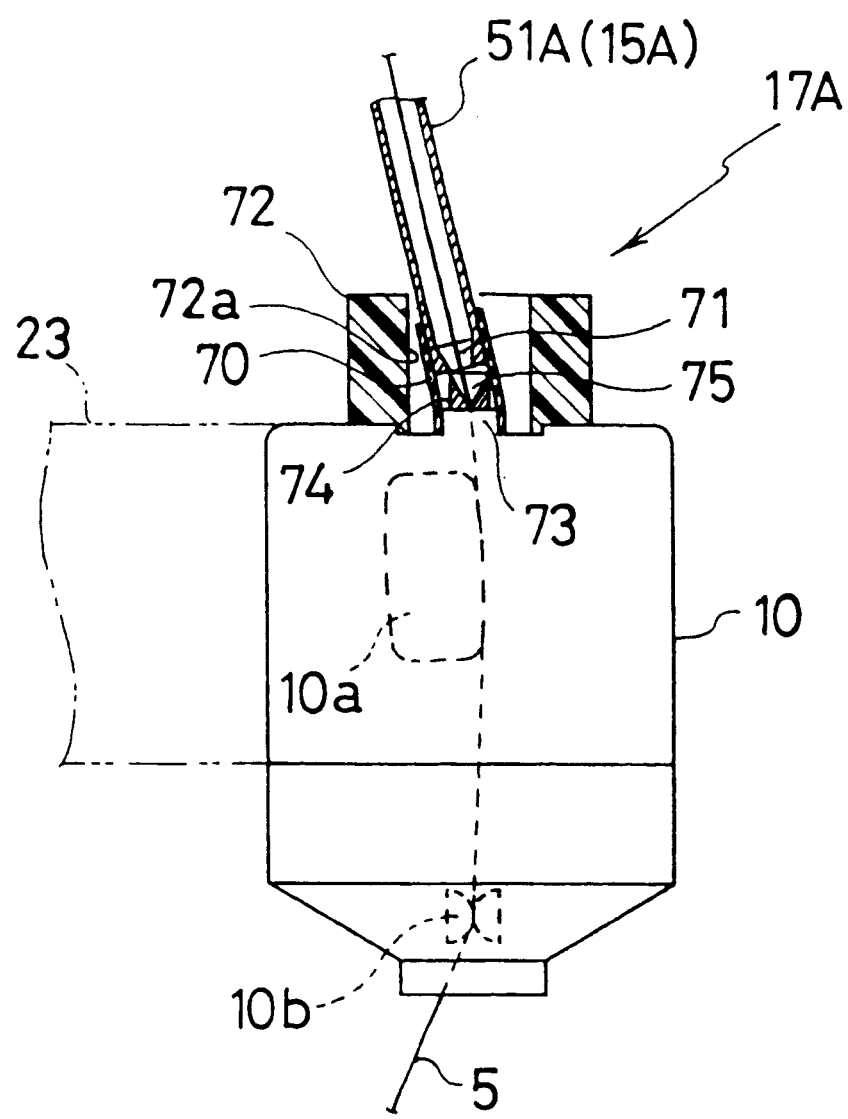
FIG. 6 is a cross-sectional view of a connecting mechanism concerning a first aspect of another embodiment of the invention.

A first embodiment of the modified aspect includes, as shown in FIG. 6, a connecting mechanism 17*a*, which includes a tubular elastic rubber 70, instead of the second spherical, bearing mechanism 17. A wire guide part 71 in the shape of a reverse cone, is formed inside of the bottom of a second pipe 51A that includes a pipe 51A. A guide 72 has a through hole 72*a* inside. A round projection 73, which is formed on the top of the first wire guide 10, is provided in the hole 72*a*.

The round projection 73 has a pointed projection 74 thereon, which forms a wire guide part 75 in the shape of a reverse cone, to be connected to the first wire guide 10. The bottom of the second pipe 51A and the round projection 73 are fixed by the tubular elastic rubber 70. Even if the second pipe 51A oscillates, the wire electrode 5 is surely guided into the first wire guide 10 from the second pipe 51A because the bottom of the wire guide part 75 is on the center of the axis of the second pipe 51A.

According to the first embodiment of the modified aspect, the connecting mechanism 17A has advantages of simple construction with inexpensive cost and being free from dust because there is no space between connecting elements.

Figure 7:
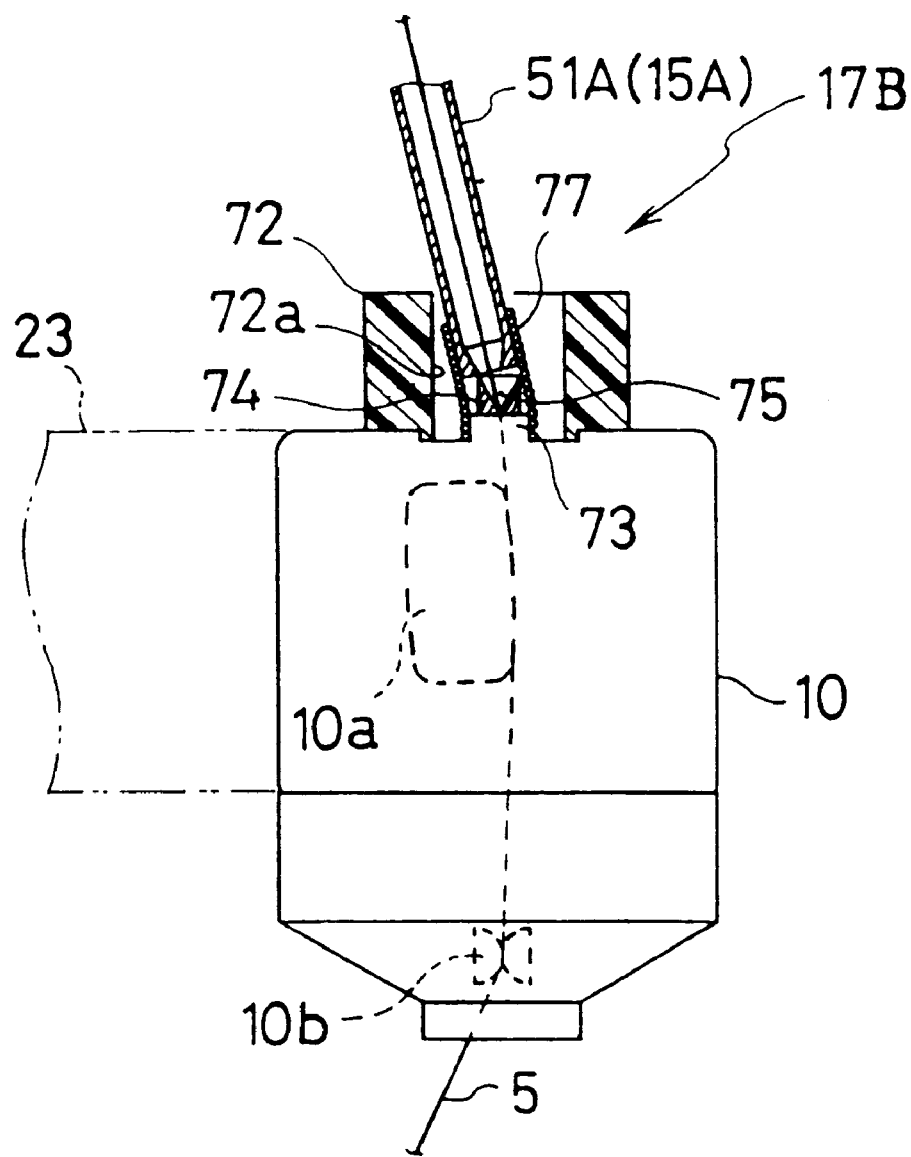
FIG. 7 is a cross-sectional view of a connecting mechanism concerning a second aspect of another embodiment of the invention.

A second embodiment of the modified aspect includes, as shown in FIG. 7, a connecting mechanism 17B which has a coiled elastic member 77, instead of the above-mentioned tubular elastic rubber 70. The connecting mechanism 17B has the same action and advantages as the first embodiment.

Figure 8:
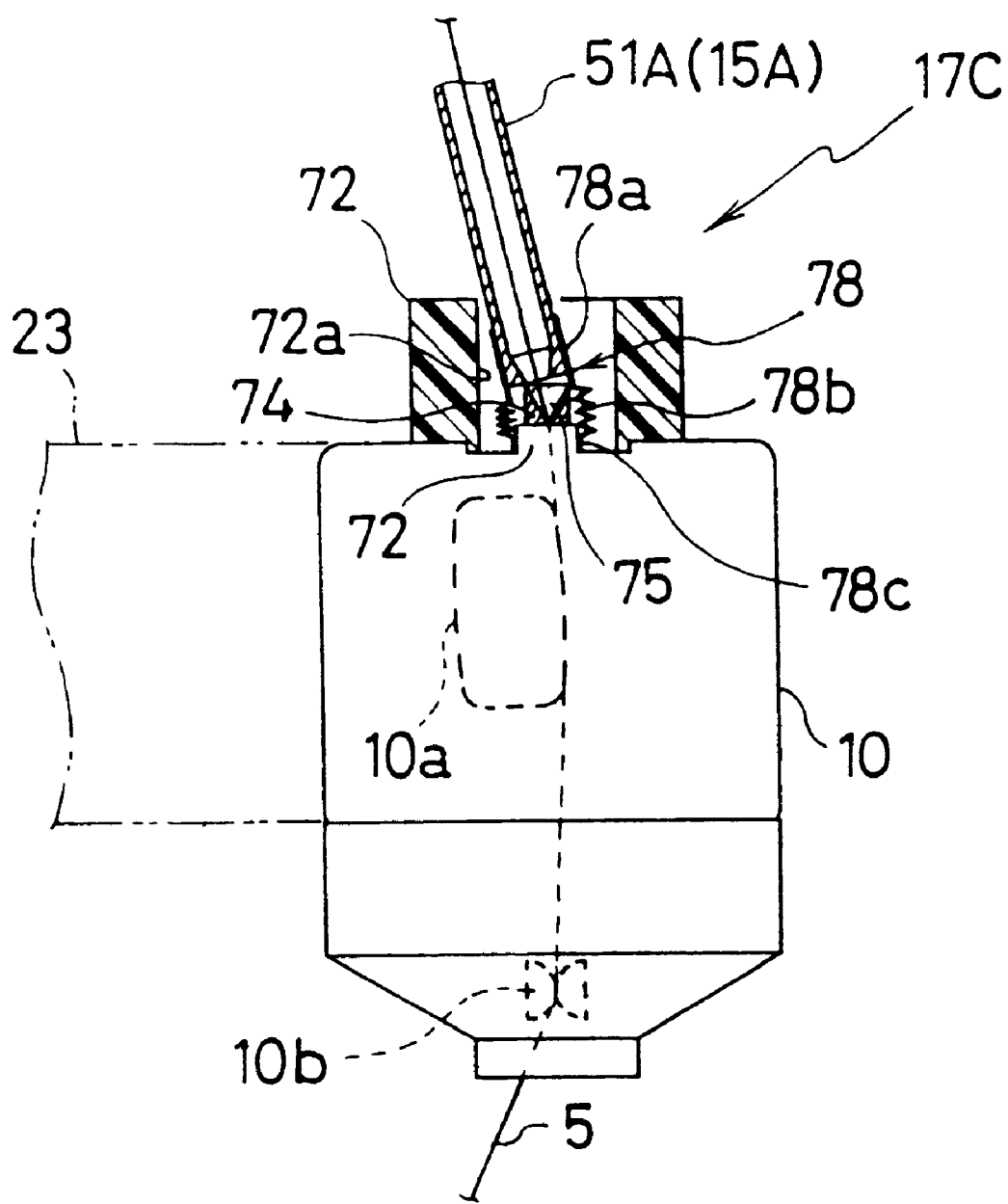
FIG. 8 is a cross-sectional view of a connecting mechanism concerning a third aspect of another embodiment of the invention.

A third embodiment of the modified aspect includes, as shown in FIG. 8, a connecting mechanism 17C which includes an accordion elastic member 78, instead of the tubular elastic rubber 70 and the coiled elastic member 77. In the connecting mechanism 17C, a combination of a tubular part 78*a*, an accordion part 78*b*, and a tubular part 78*c* is used instead of the accordion elastic member 77. The tubular part 78*a* is fixed to the bottom of the second pipe 51A, and the tubular part 78*c* is fitted on the projection 72. Operation and advantages of the connecting mechanism 17C are also similar to the first and second connecting mechanisms 17A and 17B.

A connecting mechanism described in any of the first to third embodiments may be adopted instead of the first spherical bearing mechanism 16. The wire-cut discharge machine described in the above embodiments shows just a few examples. It goes without saying that the invention is applicable to various wire-cut electric discharge machines within the range that is not beyond the objects of the invention.

In the above embodiments, for example, the pipe 15 is covered with the insulated tubular cover 52 made of synthetic resin. Instead of the insulated tubular cover 52, an insulated resin film can be coated directly around the pipe 15. If it has stiffness equivalent to a metal, the pipe 15 itself may be made from insulated materials like resin. In other words, only the surface of the pipe 15 needs covering with insulated materials.

What is claimed is:

1. A wire-cut electric discharge machine for use with a workpiece, comprising:

a frame having a wire extending section;

a wire electrode extending from the wire extending section of the frame;

a first wire guide disposed at an upstream side of the workpiece relative to the wire electrode, the first wire guide guiding the wire electrode;

a second wire guide disposed at a downstream side of the workpiece relative to the wire electrode and opposite the first wire guide, the second wire guide guiding the wire electrode;

a first moving device that moves the workpiece relative to the first wire guide and the second wire guide;

a second moving device that moves the first wire guide in a direction that is substantially perpendicular to a direction of extension of the wire electrode;

a hollow member having one end and an other end, extending in a lengthwise direction, and being disposed between the wire extending section of the frame and the first wire guide, the wire electrode extending through the hollow member, the hollow member being able to extend and contract along the lengthwise direction; and a connecting mechanism that connects the one end of the hollow member to the frame and connects the other end of the hollow member to the first wire guide, the connecting mechanism including a first connecting member and a second connecting member, the first connecting member being attached to the frame, the first connecting member enabling the one end of the hollow member to oscillate, the second connecting member being attached to the first wire guide, and the second connecting member enabling the other end of the hollow member to oscillate.

2. The wire-cut electric discharge machine according to claim 1, further comprising a third moving device that moves the first wire guide in a direction that is substantially along the direction of extension of the wire electrode.

3. The wire-cut electric discharge machine according to claim 1, wherein the hollow member comprises a plurality of pipes, the pipes being slidably interconnected with each other.

4. The wire-cut electric discharge machine according to claim 1, further comprising an insulated cover that is tubular so as to cover the hollow member.

5. The wire-cut electric discharge machine according to claim 1, wherein the connecting mechanism is a spherical bearing mechanism comprising a spherical shank secured to the hollow member and a bearing surface that supports the spherical shank rotatably.

6. The wire-cut electric discharge machine according to claim 5, wherein the spherical shank includes a wire guide part provided on the spherical shank and that guides the wire electrode into the hollow member.

7. The wire-cut electric discharge machine according to claim 6, wherein the wire guide part is provided near an axis of rotation of the spherical shank.

8. The wire-cut electric discharge machine according to claim 1, wherein the connecting mechanism includes an elastic connecting member.

9. The wire-cut electric discharge machine according to claim 8, wherein the elastic connecting member is a rubbery elastic member.

10. The wire-cut electric discharge machine according to claim 8, wherein the elastic connecting member is a coiled elastic member.

11. The wire-cut electric discharge machine according to claim 8, wherein the elastic member is an accordion-shaped member.

12. The wire-cut electric discharge machine according to claim 1, further comprising an automatic connection device that connects broken wire electrodes automatically, wherein the automatic connection device is mounted to the frame, and the first connecting member is attached to the automatic connection device.

13. A wire-cut electric discharge machine for use with a workpiece, comprising:
a frame having a wire extending section;
a wire electrode extending from the wire extending section of the frame;
a first wire guide disposed at an upstream side of the workpiece relative to the wire electrode, the first wire guide leading the wire electrode;
a second wire guide disposed at a downstream side of the workpiece relative to the wire electrode and opposite the first wire guide, the second wire guide guiding the wire electrode;
a drive device that moves the workpiece relative to the first wire guide and the second wire guide; and
a hollow member having a surface, extending in a lengthwise direction, and being disposed between the wire extending section of the frame and the first wire guide, the wire electrode extending through the hollow member, the hollow member being able to extend and contract along the lengthwise direction, at least a part of the surface on the hollow member being covered with an insulating material.

14. The wire-cut electric discharge machine according to claim 13, wherein the hollow member comprises:
a metallic pipe; and
a tubular cover that covers the hollow member, the tubular cover being made of an insulating material.

15. The wire-cut electric discharge machine according to claim 13, wherein the hollow member comprises a pipe made from an insulating material.

16. The wire-cut electric discharge machine according to claim 13, wherein the hollow member comprises a metallic pipe and insulation formed on the metallic pipe.

17. The wire-cut electric discharge machine according to claim 13, wherein the hollow member comprises a first pipe and a second pipe, the second pipe has a diameter that is larger than a diameter of the first pipe, and the first pipe and the second pipe are slidably interconnected with each other.

18. A method of operating a wire-cut electric discharge machine for use with a workpiece, comprising the steps of:
extending a wire electrode from a wire extending section of a frame;
guiding the wire electrode with a first wire guide that is disposed at an upstream side of the workpiece relative to the wire electrode;
guiding the wire electrode with a second wire guide that is disposed at a downstream side of the workpiece relative to the wire electrode;
moving the workpiece relative to the first wire guide and the second wire guide with a first moving device;
moving the first wire guide in a direction that is substantially perpendicular to a direction of extension of the wire electrode with a second moving device;
surrounding a section of the wire electrode with a hollow member that is disposed between the wire extending section of the frame and the first wire guide, the hollow member being able to extend and contract along a lengthwise direction; and
connecting one end of the hollow member to the frame and an other end of the hollow member to the first wire guide with a connecting mechanism so as to enable the one end and the other end of the hollow member to oscillate.

19. A wire-cut electric discharge machine for use with a workpiece and a wire electrode, comprising:
a frame having a wire extending section;
means for extending the wire electrode from the wire extending section of the frame;
first means for guiding the wire electrode, the first means for guiding being disposed at an upstream side of the workpiece relative to the wire electrode;
second means for guiding the wire electrode, the second means for guiding being disposed at a downstream side of the workpiece relative to the wire electrode;
means for moving the workpiece relative to the first means for guiding and the second means for guiding;
means for moving the first means for guiding in a direction that is substantially perpendicular to a direction of extension of the wire electrode;
means for surrounding a section of the wire electrode, the means for surrounding being disposed between the wire extending section of the frame and the first means for guiding, the means for surrounding being able to extend and contract along a lengthwise direction; and
means for connecting one end of the means for surrounding to the frame and an other end of the means for surrounding to the first means for guiding so as to enable the one end and the other end of the means for surrounding to oscillate.

* * * * *